United States Patent [19]

Matsubara

[11] Patent Number: 5,025,278

[45] Date of Patent: Jun. 18, 1991

[54] PLATE FOR LIGHT SHIELDING BLADE

[75] Inventor: Takashi Matsubara, Tokyo, Japan

[73] Assignee: Nikon Corporation, Tokyo, Japan

[21] Appl. No.: 501,371

[22] Filed: Mar. 27, 1990025278231002350273

[51] Int. Cl.$^5$ .............................................. G03B 9/40
[52] U.S. Cl. ................................... 354/246; 350/273; 428/113; 428/408
[58] Field of Search ........................ 354/226, 245–249, 354/250; 350/266, 272, 273; 428/113, 408, 288

[56] References Cited

U.S. PATENT DOCUMENTS 4,482,231  11/1984  Kato et al. ........................... 354/246
4,792,481  12/1988  O'Connor et al. ................... 428/288

FOREIGN PATENT DOCUMENTS 59-61827  4/1984  Japan .

Primary Examiner—Brian W. Brown
Attorney, Agent, or Firm—Shapiro and Shapiro

[57] ABSTRACT

A thin plate composed of a carbon fiber reinforced plastic laminate of plural reinforced resin sheets, in which each sheet has continuous carbon fibers oriented in a predetermined direction and matrix resin enveloping the carbon fibers, the matrix resin having a glass transition temperature at least equal to 120° C., and the plate having a thickness in a range of 60 to 120 μm.

12 Claims, 1 Drawing Sheet

PLATE FOR LIGHT SHIELDING BLADE

This is a continuation of application Ser. No. 365,293 filed June 13, 1989, now abandoned.

BACKGROUND OF THE INVENTION

1. Field of the Invention

The present invention relates to a plate for use as a light shielding blade that is required to move at a high speed, such as shutter blades of a focal plane shutter or a lens shutter of a camera, or diaphragm blades thereof.

b 2. Related Background Art

For such light shielding blades, there are required a small actuating force and a sufficient bending rigidity, in addition to the ability for high-speed movement.

For meeting these requirements, there is required a light shielding blade of light weight, high strength and high elasticity.

The present inventors has investigated a plastic sheet reinforced with continuous carbon fibers oriented in a predetermined direction (hereinafter referred to as CFRP (carbon fiber reinforced plastic) sheet), and identified that a plate material obtained by laminating a plurality of such sheets with mutually orthogonal or substantially orthogonal fiber directions was suitable as the material for light shielding blades capable of high speed movement in view of weight, strength and ease of manufacture (cf. Japanese Laid-open Patent No. 59-61827).

In this case, said plate material is produced by laminating a plurality of prepreg sheets which are precursors of CFRP sheets in such a manner that the directions of fibers mutually cross orthogonally or substantially orthogonally, and hardening the entire laminate by heating in a pressed state.

Said prepreg sheet is obtained by aligning continuous carbon fibers in a predetermined direction, in the form of a thin plate, impregnating said carbon fibers with thermosetting resin liquid which is a precursor of matrix resin (for example unhardened liquid of epoxy resin or unsaturated polyester) and transforming said resin liquid into so-called B-stage, in which the resin is already solidified and lacks fluidity but can be finally hardened by heating. It has a low resin content, and, in appearance, it looks like a bundle of hair-like carbon fibers each thinly coated with glue-like resin liquid.

Said plate material is worked (for example cutting and drilling) to obtain a predetermined shape of the light shielding blade. The light shielding blade thus obtained requires a low actuating force, has sufficient bending rigidity and can still be moved at a high speed.

The light shielding blade for high speed running has to be of a thickness not exceeding 0.12 mm and to be finished with sufficient flatness without bending. In addition, it has to maintain stable performance and quality even in varying circumferential conditions.

However, the conventionally known light shielding blades have been found to often show bending under a change in temperature and humidity, even if the flatness seems satisfactory in the beginning.

For this reason, if a shutter employing such light shielding blades is used in a camera, the bending of the blades may result in uneven blade running, fluctuations in the shutter speed, breakage of blades and light leakage through gaps between the blades.

SUMMARY OF THE INVENTION

The object of the present invention is to resolve the drawbacks of the above-explained plate material for light shielding blades composed of CFRP laminate, and to provide a plate material providing sufficient light shielding property, satisfactory flatness and stable quality against variations in circumferential conditions.

The molding of CFRP sheet is generally conducted by heating under pressure, for 1-2 hours at a temperature 120°-130° C. in a hot press or an autoclave. Notably, such molded plate material showed considerable fluctuation in durability, when a test was conducted with a shutter utilizing light shielding blades formed from said plate material. Investigation proved that the cause lay in the material itself. Further analysis proved the presence fluctuations specific to fiber-reinforced plastic plate, such as fluctuation in the strength caused by distortion in fiber arrangement, or fluctuation in the internal stress resulting from variation in the distribution of matrix resin.

However, the present inventor hypothesized the presence of a more basic problem related to the material itself, and decided to evaluate the hardening process of the matrix resin. The hardening process may be evaluated by the dielectric property, dynamic viscoelasticity, or Tg (glass transition temperature, by thermal analysis. The direct evaluation of resinous material containing continuous fibers in excess of 50 wt.% is quite difficult, and considerable variations in the result were anticipated in certain methods of evaluation. The present inventor investigated Tg measurement through differential scanning calorimetry (DSC), thermomechanical analysis (TMA) and dynamic thermomechanometry (DTA), and succeeded in obtaining consistent results through strict control of the measuring conditions. Said glass transition temperature can be measured by DTA or DSC as a change in the specific heat, or by TMA as a function of thermal expansion coefficient or softening.

The measured Tg of the molded CFRP sheets was found to fluctuate in a range of 80° to 130° C. There were considered various factors influencing the Tg value, including certain molding conditions such as the heat-press schedule, jigs employed in the molding, influence of auxiliary materials such as cushioning agent or releasing agent, or influence of circumferential conditions at the molding, and certain factors relating to the matrix resin such as the distribution of length of oligomers in the main component or blending ratio of various components such as hardening agent Substantially the same results were observed when carbon black was added to the matrix resin for the purpose of improving the light shielding ability. The carbon black addition was effective when the average particle size did not exceed 0.07 μm and the amount was 2-15 wt.% of the matrix resin. Substantially the same results were also observed with a carbon fiber content within a range of 10-40 g/m² and with a resin content within a range of 35-55 wt.%.

The fluctuation in Tg was found to originate from the thickness of the plate as small as 60 to 120 μm. More specifically, it seems to originate from the particular molding schedule for obtaining an extremely good flatness for such thin plate material Further investigation revealed that the aforementioned drawbacks were related to Tg of the matrix resin in the molded product, and that they could be avoided if Tg is equal to or higher than 120° C.

For example, when epoxy resin was employed as the matrix resin, the Tg equal to or higher than 120° C. elevated the crosslinking density, and improved the scratch resistance and abrasion resistance in the shutter blades prepared from such plate material.

The connection of the light shielding blade with a driving member is often made by forming holes in said blade and fixing said blade with caulking pins. In this method the plate material is required to have an impact strength and a resistance against hole stretching. These properties were also improved, thus contributing to the improvement of the durability of the shutter.

Thus the object of the present invention is to provide a thin plate composed of a carbon fiber reinforced plastic laminate of a plurality of reinforced resin sheets, preferably 3 to 5 sheets arranged in plane symmetric manner, wherein each of said reinforced resin sheets is composed of continuous carbon fibers oriented in a predetermined direction and matrix resin enveloping said continuous fibers, said matrix resin has a glass transition temperature at least equal to 120° C., and said plate has a thickness in a range of 60 to 120 $\mu$m.

The reinforced resin sheets to be laminated need not be of a same thickness, and sheets of different thicknesses may be combined if they are arranged in symmetric manner with respect to the central plane.

Also, it is possible to increase the thickness of the intermediate layer in order to improve the isotropic nature of the strength.

DESCRIPTION OF THE PREFERRED EMBODIMENTS

Figure 1:
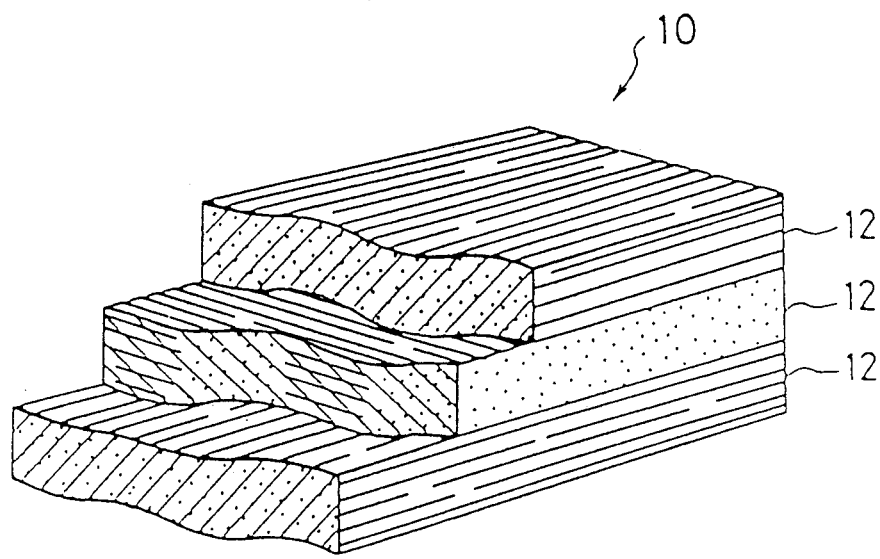
FIG. 1 is a partially cut-away perspective view of a light shielding plate material according to the present invention.

At first there was prepared a prepreg sheet containing continuous carbon fibers oriented in a predetermined direction and impregnated with thermosetting resin. More specifically, a resin composition consisting of 70 parts by weight of phenol novolak epoxy resin, Araldite EPN1138 (supplied by Japan Ciba-Geigy) 20 parts by weight of bisphenol-A epoxy resin, Epicote 1002 (supplied by Yuka Shell Epoxy Co. ), 10 parts by weight of similar resin, Epicote 838 (supplied by the same company), 3 parts to 100 parts by weight of the resin of dicyandiamide as the hardening agent, and 5 parts to 100 parts by weight of resins, of 3,4-dichlorophenyl-1,1-dimethyl urea as the hardening accelerator, was combined with carbon black of an average particle size of 0.01 $\mu$m in an amount of 10 wt.%, and mixed well. Then 150 bundles of carbon fibers, each containing 3000 fibers of a thickness of 7 $\mu$m were arranged and impregnated with said resin composition to obtain a prepreg sheet 12 (FIG. 1) with a resin content of 45 wt.% and a fiber content of 25 g/m$^2$.

Three sheets thus prepared were laminated in plane symmetry, in such a manner that the direction of fibers in each sheet was orthogonal or substantially orthogonal to that of the adjacent sheet.

Three such laminated sheets were hardened by heat and pressure in a hot press under different conditions to obtain three plate materials. The hardening conditions were respectively: 110° C., 30 min., 10 kg/cm$^2$; 120° C., 30 min., 10 kg/cm$^2$; and 130° C., 6 hrs., 10 kg/cm$^2$.

All the obtained plates 10 had a thickness of about 90 $\mu$m. The Tg values were measured, using a part of said plates, by differential scanning calorimetry with an equipment model DSC-100 supplied by Seiko Denshi Co., Ltd.

Also, light shielding blades were prepared by pressing and painting said plate materials, and the blades were used in preparing vertically running focal plane shutters for durability testing. Said shutters were subjected to driving tests in atmospheres of:

(A) 60° C., 90 % relative humidity; and
(B) 100° C., 5 % relative humidity.

The obtained results are shown in Table 1.

TABLE 1

| Test condition | Test results Plate material | | |
|---|---|---|---|
| | Tg = 80–90° C. | Tg = 100–110° C. | Tg = 120–140° C. |
| A | abnormality after several thousand times | abnormality after 20–30 thousand times | no abnormality after 100,000 times |
| B | abnormality after several thousand times | abnormality after less than 10,000 times | no abnormality after 100,000 times |

Abnormality means failure in shutter function resulting from light shielding blades, such as blade breakage, uneven running, variation in shutter speed and light leakage through gaps between blades.

As indicated in Table 1, the plate materials with Tg lower than 120° C. showed marked appearance of abnormalities, and they were by comparison, unsuitable for use in the light shielding blade.

It will thus be appreciated that the measurement of Tg on a part of the molded plate material indicates whether said plate material is well adapted for use in the light shielding blade.

Figure 2:
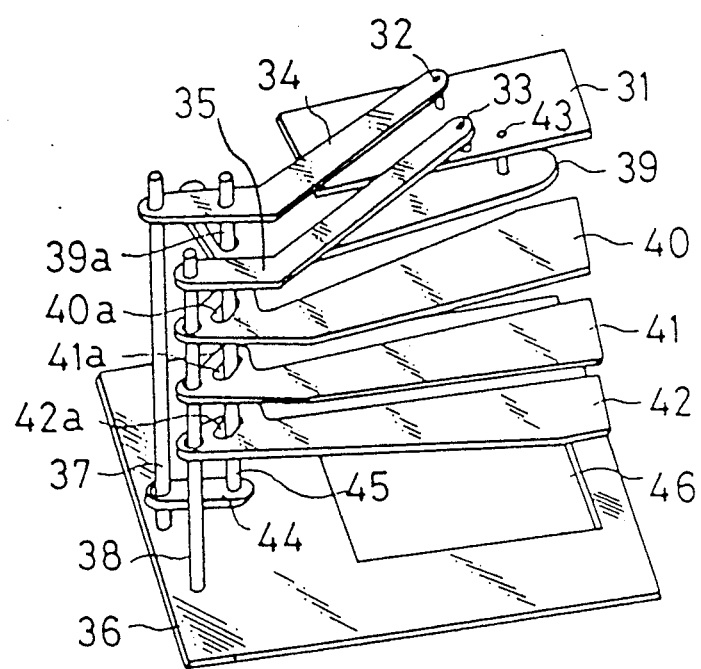
FIG. 2 is an assembly view of a light shielding device employing the light shielding plate of the present invention.

FIG. 2 is an assembly view of a vertically running focal plane shutter, employing the above-explained plate material for a first blade 31, a second blade 39, a third blade 40, a fourth blade 41 and a fifth blade 42.

Arms 34, 35 are respectively articulated to pins 32, 33 fixed on the first blade 31, and are rendered rotatable about shafts 37, 38 fixed on a shutter substrate 36. Since the pins 32, 33 and the shafts 37, 38 are substantially so positioned as to form a parallelogram, the first blade 31 performs a parallel displacement in the vertical direction of an aperture 46, by the rotation of the arms 32, 33. However the second, third, fourth and fifth blades 39, 40, 41, 42 move differently from the first blade. A pin 43 fixed on the first blade 31 is rotatably coupled with the second blade 39, which is provided, at the base portion thereof, with a cam groove 39a engaging with a pin 45 fixed on an arm 44 rotatably supported by the shaft 37. Consequently the movement of the second blade 39 is determined, through the pin 43, by the movement of the pin 45 and the form of the cam groove 39a. The third blade 40 is rotatably supported by the shaft 38 and is provided, at the base portion thereof, with a cam groove 40a engaging with the pin 45. Similarly the fourth and fifth blades 41, 42 are rotatably supported by the shaft 38 and are respectively provided with cam grooves 41a, 42a engaging with the pin 45. Said pin 45 is also rotatably linked with the arm 34 rotatably supported by the shaft 37, and rotates with the arm 44 rotating about the shaft 37. The cam grooves 39a, 40a, 41a, 42a of the blades are so formed that said blades are extended to cover the aperture when the first blade 31 is in the upper portion of the aperture 46, but said blades mutually overlap when the first blade 31 is retracted below the aperture. In this case, three blades from third to fifth (40-42) rotate about the shaft 38 as in a folding fan. In such a focal plane shutter there is usually provided another set of similar blades, wherein a set of blades is used as a shutter opening member while the other set is used as a shutter closing member, functioning with a time lag therebetween.

In such a focal plane shutter, the use of conventional plate materials may give rise to uneven running, a variation of shutter speed, breakage of blades and light leaking through gaps between the blades due to the bending of the blades. On the other hand, the plate of the present invention can provide light shielding blades of light weight, high strength and high elasticity, whereby it is possible to achieve a focal plate shutter which avoids such drawbacks, as explained above.

The use of CFRP sheet for light shielding blades has heretofore presented certain practical difficulty, because all shutters have had to be subjected to a driving test due to the inevitable fluctuation in the characteristics of the material. However, the present invention makes it possible to determine appropriate plate materials in advance, and has thereby greatly facilitated the use CFRP blades in shutters. Also, because appropriate plate materials may be reliably selected in advance, the invention makes it possible to avoid unnecessary working costs that result from the selection of unsuitable or defective plate materials, thus reducing the cost to manufacture shutters and the like using CRFP.

What is claimed is:

1. A thin plate having a thickness of 60 to 120 μm and comprising a laminate of plural carbon fiber reinforced resin sheets
    each having continuous carbon fibers oriented in a predetermined direction and epoxy resin enveloping said continuous fibers, said epoxy resin having a glass transition temperature which is equal to or more than 120° C.

2. A thin plate according to claim 1, obtained by laminating plural prepregs respectively constituting said reinforced resin sheets, followed by hardening with heating in pressed state.

3. A light shielding blade having a thickness of 60 to 120 μm and comprising a laminate of plural carbon fiber reinforced resin sheets
    each having continuous carbon fibers oriented in a predetermined direction and epoxy resin enveloping said continuous fibers, said epoxy resin having a glass transition temperature which is equal to or more than 120° C.

4. A light shielding blade according to claim 3, wherein said plural reinforced resin sheets are laminated in such a manner that said continuous fibers in each sheet are orthogonal to those in each adjacent sheet.

5. A light shielding blade according to claim 3 wherein said plural reinforced resin sheets are laminated in plane symmetric manner.

6. A light shielding blade according to claim 5, wherein 3 to 5 reinforced resin sheets are laminated.

7. A light shielding blade according to claim 3, obtained by laminating plural prepregs respectively constituting said reinforced resin sheets, followed by hardening with heating in pressed state.

8. A shutter blade having a thickness of 60 to 120 μm and comprising a laminate of plural carbon fiber reinforced resin sheets
    each having continuous carbon fibers oriented in a predetermined direction and epoxy resin enveloping said continuous fibers, said epoxy resin having a glass transition temperature which is equal to or more than 120° C.

9. A shutter blade according to claim 8, wherein said plural reinforced resin sheets are laminated in such a manner that said continuous fibers in each sheet are orthogonal to those in each adjacent sheet.

10. A shutter blade according to claim 8, wherein said plural reinforced resin sheets are laminated in plane symmetric manner.

11. A shutter blade according to claim 10, wherein 3 to 5 reinforced resin sheets are laminated.

12. A shutter blade according to claim 8, obtained by laminating plural prepregs respectively constituting said reinforced resin sheets, followed by hardening with heating in pressed state.

* * * * *